US012659445B1

(12) United States Patent
Liou et al.

(10) Patent No.: US 12,659,445 B1
(45) Date of Patent: Jun. 16, 2026

(54) THREE-DIMENSIONAL DISPLAY DEVICE AND OPERATION METHOD THEREOF

(71) Applicant: Innolux Corporation, Miaoli County (TW)

(72) Inventors: Hao-Yu Liou, Miaoli County (TW); Wei-Yi Lu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 19/074,461

(22) Filed: Mar. 10, 2025

Related U.S. Application Data

(60) Provisional application No. 63/573,477, filed on Apr. 3, 2024.

(30) Foreign Application Priority Data

Sep. 25, 2024 (CN) .......................... 202411344614.1

(51) Int. Cl.
H04N 13/125 (2018.01)
H04N 13/305 (2018.01)
H04N 13/383 (2018.01)

(52) U.S. Cl.
CPC ......... H04N 13/125 (2018.05); H04N 13/305 (2018.05); H04N 13/383 (2018.05)

(58) Field of Classification Search
CPC .................................................. H04N 3/125
USPC ......................................................... 348/58
See application file for complete search history.

(56) References Cited

U.S. PATENT DOCUMENTS

2019/0082168 A1* 3/2019 Lee ........................ H04N 13/31
2022/0337807 A1* 10/2022 Perreault ............. H04N 13/327

FOREIGN PATENT DOCUMENTS

| CN | 103595987 | 7/2017 |
| CN | 109495734 | 12/2021 |
| EP | 3454553 | 3/2019 |
| WO | 2022220889 | 10/2022 |

OTHER PUBLICATIONS

"Search Report of Europe Counterpart Application", issued on Jul. 18, 2025, p. 1-p. 12.

* cited by examiner

*Primary Examiner* — Amir Shahnami
(74) *Attorney, Agent, or Firm* — JCIPRNET

(57) ABSTRACT

A three-dimensional display device includes an eye tracking device, a display, and first and second processing units. The first processing unit calculates coordinates of left and right viewpoints based on left and right eye image data. The display includes light-emitting units for emitting light beams and light-splitting units for distributing the light beams to the left and right viewpoints. The second processing unit defines a crosstalk region based on an opening angle and optical paths of the light beams passing through the light-splitting units. The crosstalk region is simultaneously struck by a first light beam assigned to the left viewpoint and a second light beam assigned to the right viewpoint. The second processing unit compares preset gray levels of the first and second light beams and then determines corrected gray levels of the first and second light beams. An operation method of a three-dimensional display device is also provided.

18 Claims, 7 Drawing Sheets

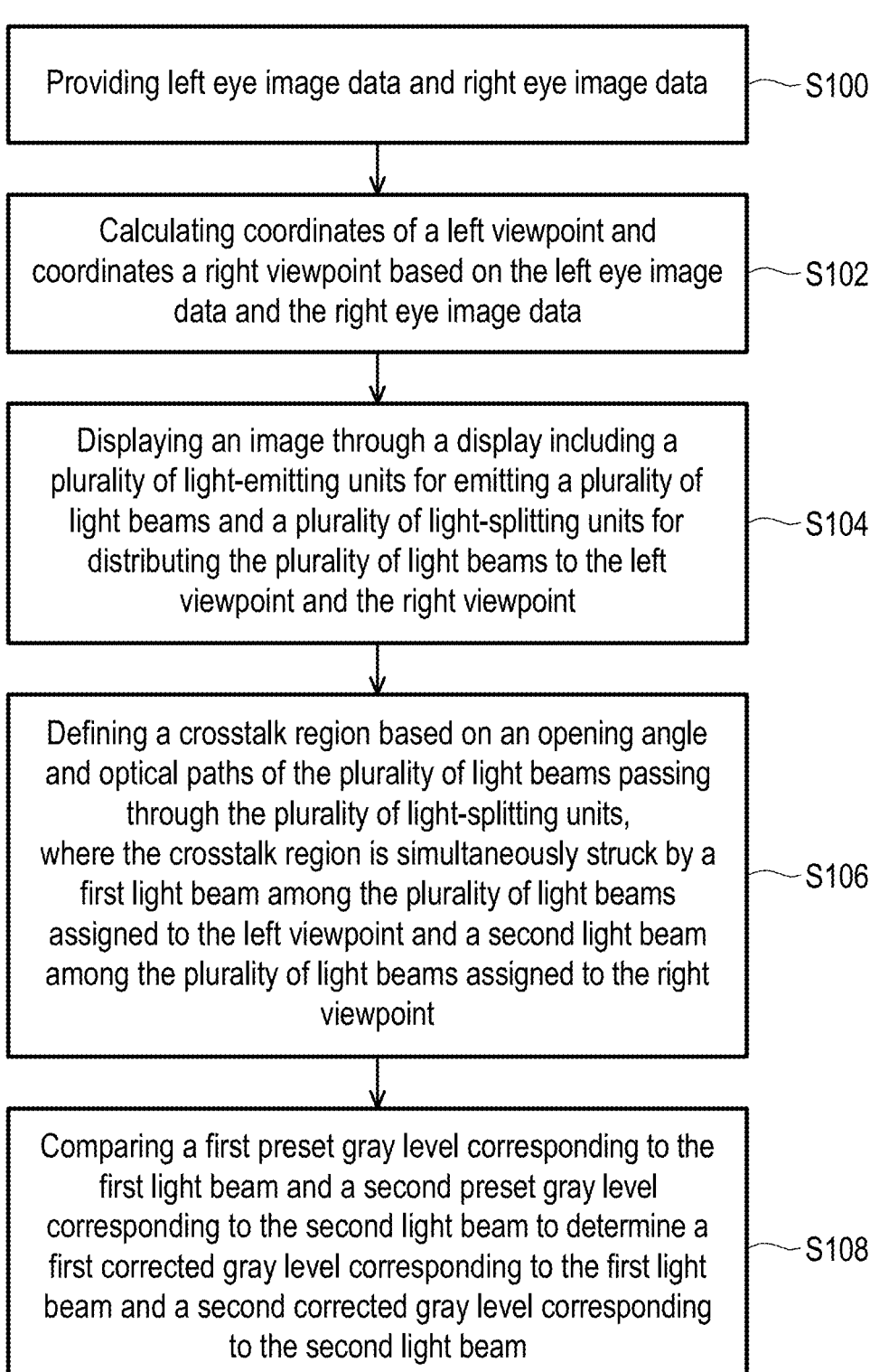

Providing left eye image data and right eye image data ~S100

Calculating coordinates of a left viewpoint and coordinates a right viewpoint based on the left eye image data and the right eye image data ~S102

Displaying an image through a display including a plurality of light-emitting units for emitting a plurality of light beams and a plurality of light-splitting units for distributing the plurality of light beams to the left viewpoint and the right viewpoint ~S104

Defining a crosstalk region based on an opening angle and optical paths of the plurality of light beams passing through the plurality of light-splitting units, where the crosstalk region is simultaneously struck by a first light beam among the plurality of light beams assigned to the left viewpoint and a second light beam among the plurality of light beams assigned to the right viewpoint ~S106

Comparing a first preset gray level corresponding to the first light beam and a second preset gray level corresponding to the second light beam to determine a first corrected gray level corresponding to the first light beam and a second corrected gray level corresponding to the second light beam ~S108

FIG. 9

THREE-DIMENSIONAL DISPLAY DEVICE AND OPERATION METHOD THEREOF

CROSS-REFERENCE TO RELATED APPLICATION

This application claims the priority benefit of U.S. provisional application Ser. No. 63/573,477, filed on Apr. 3, 2024, and China application serial no. 202411344614.1, filed on Sep. 25, 2024. The entirety of each of the above-mentioned patent applications is hereby incorporated by reference herein and made a part of this specification.

BACKGROUND

Technical Field

The disclosure relates to an electronic device and an operation method thereof, and in particular, relates to a three-dimensional display device and an operation method thereof.

Description of Related Art

The three-dimensional display device transmits the left and right eye image light with parallax to the left and right eyes of the user through the light-splitting units (e.g., cylindrical lens or a parallax barrier) to generate a three-dimensional image (or a stereoscopic image). The light-emitting units in the three-dimensional display device is not a perfect point light source, the light-splitting units cannot well collimate the light emitted by the light-emitting units, and/or the matching between the light-splitting units and the light-emitting units is not perfect. The above factors make it easy for blur and/or ghosting (or overlapping images) to appear in a three-dimensional image.

SUMMARY

The disclosure provides a three-dimensional display device and an operation method thereof capable of providing improved three-dimensional image quality.

An embodiment of the disclosure provides a three-dimensional display device including an eye tracking device, a first processing unit, a display, and a second processing unit. The eye tracking device provides left eye image data and right eye image data. The first processing unit is coupled to the eye tracking device and calculates coordinates of a left viewpoint and coordinates of a right viewpoint based on the left eye image data and the right eye image data. The display displays an image and includes a plurality of light-emitting units for emitting a plurality of light beams and a plurality of light-splitting units for distributing the light beams to the left viewpoint and the right viewpoint. The second processing unit is coupled to the first processing unit and the display. The second processing unit defines a crosstalk region based on an opening angle and optical paths of the light beams passing through the light-splitting units. The crosstalk region is simultaneously struck by a first light beam among the plurality of light beams assigned to the left viewpoint and a second light beam among the plurality of light beams assigned to the right viewpoint. The second processing unit compares a first preset gray level of the first light beam and a second preset gray level of the second light beam and then determines a first corrected gray level of the first light beam and a second corrected gray level of the second light beam.

Another embodiment of the disclosure further provides an operation method of a three-dimensional display device, and the method includes the following steps. Left eye image data and right eye image data are provided. Based on the left eye image data and the right eye image data, coordinates of a left viewpoint and coordinates a right viewpoint are calculated. An image is displayed through a display including a plurality of light-emitting units for emitting light beams and a plurality of light-splitting units for distributing the light beams to the left viewpoint and the right viewpoint. A crosstalk region is defined based on an opening angle and optical paths of the plurality of light beams passing through the plurality of light-splitting units. The crosstalk region is simultaneously struck by a first light beam among the plurality of light beams assigned to the left viewpoint and a second light beam among the plurality of light beams assigned to the right viewpoint. Further, a first preset gray level of the first light beam and a second preset gray level of the second light beam are compared to determine a first corrected gray level of the first light beam and a second corrected gray level of the second light beam.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 9 is a flow chart of an operation method of a three-dimensional display device according to some embodiments of the disclosure.

DESCRIPTION OF THE EMBODIMENTS

Figure 1:
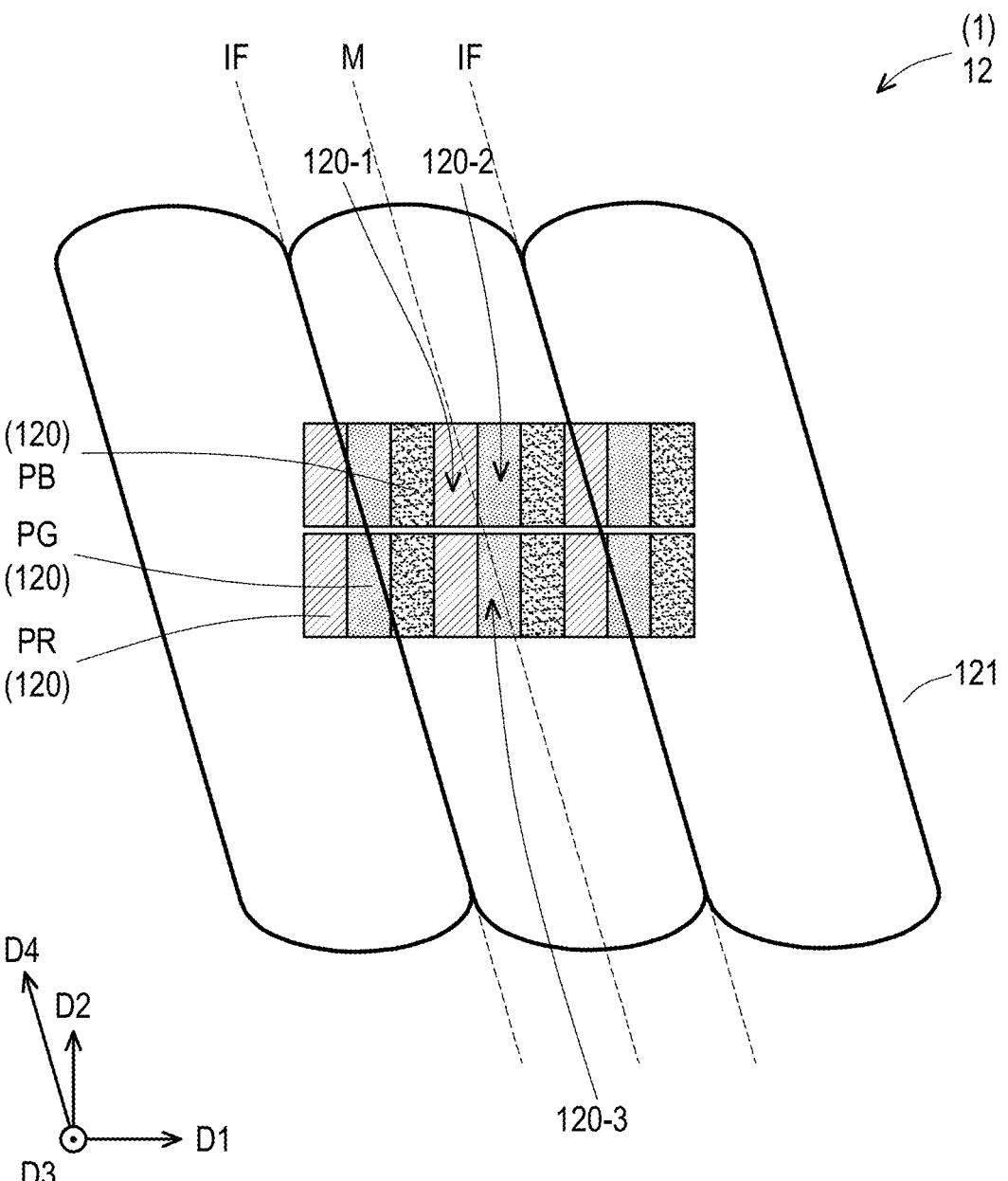
FIG. 1 is a partial schematic top view of a display in a three-dimensional display device according to some embodiments of the disclosure.

Descriptions of the disclosure are given with reference to the exemplary embodiments illustrated by the accompanying drawings. Wherever possible, the same reference numerals are used in the drawings and the description to refer to the same or like parts.

Certain terminologies will be used to refer to specific elements throughout the specification and the appended claims of the disclosure. A person having ordinary skill in the art should understand that manufacturers of electronic devices may refer to same elements under different names. The disclosure does not intend to distinguish elements with the same functions but different names. In the following specification and claims, the terminologies "containing", "comprising", etc. are open-ended terminologies, so they should be interpreted to mean "including but not limited to . . .".

In the following embodiments, wording used to indicate directions, such as "up", "down", "front", "back", "left", and "right" merely refers to directions in the accompanying figures. Accordingly, the directional terminologies provided herein serve to describe rather than limiting the disclosure. In the accompanying drawings, each figure illustrates methods applied in particular embodiments and general features of structures and/or materials in the embodiments. However, these figures should not be construed or defined as the scope covered by the particular embodiments. For instance, relative dimensions, thicknesses, and positions of various layers, regions, and/or structures may be reduced or enlarged for clarity.

In the disclosure, if one structure (or layer, element, substrate) is described as being located on/above another structure (or layer, element, substrate), it can mean that the two structures are adjacent and are directly connected, or the two structures are adjacent to each other instead of being directly connected. Indirect connection means that at least one intermediary structure (or intermediary layer, intermediary element, intermediary substrate, intermediary interval) is provided between two structures, the lower side surface of one structure is adjacent to or is directly connected to the upper side surface of the intermediate structure, and the upper side surface of the other structure is adjacent to or is directly connected to the lower side surface of the intermediate structure. The intermediary structure may be formed by a single-layer or multi-layer physical structure or a non-physical structure, which is not particularly limited. In the disclosure, when a specific structure is arranged to be "on" another structure, it may mean that the specific structure is "directly" on another structure, or it may mean that the specific structure is "indirectly" on another structure, that is, at least one structure is provided between the specific structure and the another structure.

The terms "about", "substantially", or "approximately" are generally interpreted as being within 10% of a given value or range, or within 5%, 3%, 2%, 1%, or 0.5% of a given value or range. In addition, the wordings "the range is from the first numerical value to the second numerical value" and "the range falls between the first numerical value and the second numerical value" mean that the range includes the first numerical value, the second numerical value, and other numerical values therebetween.

Terms such as "first" and "second" used in the specification and the claims are used to modify elements, and the terminologies do not imply and represent that the element(s) have any previous ordinal numbers, nor do they represent the order of a specific element and another element or the order of a manufacturing method. The use of the ordinal numbers is only used to clearly distinguish between an element with a specific name and another element with the same name. The claims and the specification may not use the same terminologies. Accordingly, in the specification, a first member may be a second member in the claims.

An electrical connection or coupling relationship described in this disclosure may refer to a direct connection or an indirect connection. In the case of the direct connection, end points of the elements on two circuits are directly connected or connected to each other by a conductor segment, and in the case of the indirect connection, there are switches, diodes, capacitors, inductors, resistors, other appropriate elements, or a combination of the above elements between the end points of the elements on the two circuits, which should not be construed as a limitation in the disclosure.

In the disclosure, the thickness, length, and width may be measured by an optical microscope (OM), and the thickness may be measured from a cross-sectional image in an electron microscope, but the disclosure is not limited thereto. In addition, certain errors between any two values or directions for comparison may be acceptable. In addition, the wordings "the given range is from the first numerical value to the second numerical value", "the given range falls within the range of the first numerical value to the second numerical value", or "the given range falls between the first numerical value and the second numerical value" mean that the given range includes the first numerical value, the second numerical value, and other numerical values therebetween. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

Unless otherwise defined, all terms (including technical and scientific terms) used herein have the same meaning as commonly understood by a person having ordinary skill in the art. It is understood that these terms, such as those defined in commonly used dictionaries, should be interpreted as having a meaning consistent with the background or context of the relevant technology and the disclosure, and should not be interpreted in an idealized or excessively formal manner unless specifically defined in the embodiments of the disclosure.

In the disclosure, the electronic device may include but not limited to a display device, a backlight device, an antenna device, a packaging device, a sensing device, or a splicing device. The electronic device may be a bendable or flexible electronic device. The display device may be a non-self-luminous display device or a self-luminous display device. The display device may include but not limited to liquid crystal, a light emitting diode, fluorescence, phosphor, or quantum dots (QDs), other suitable display media, or a combination of the foregoing. The antenna device may include, for example, a reconfigurable intelligent surface (RIS), a frequency selective surface (FSS), a radio frequency filter (RF-filter), a polarizer, a resonator, or an antenna. The antenna may be a liquid crystal type antenna or a varactor diode antenna. The sensing device may be a sensing device that senses capacitance, light, heat energy, or ultrasound, but the disclosure is not limited thereto. In the disclosure, the electronic device may include an electronic element, and the electronic element may include a passive element and an active element, such as a capacitor, a resistor, an inductor, a diode, a transistor, etc. The diodes may include light-emitting diodes (LEDs), varactor diodes, or photodiodes. The LEDs may include but not limited to organic LEDs (OLEDs), sub-millimeter LEDs (mini LEDs), micro LEDs, or quantum dot LEDs. The splicing device may be, for example, a display splicing device or an antenna splicing device, but the disclosure is not limited thereto. Note that the electronic device may be any combination of the foregoing, but the disclosure is not limited thereto. The packaging device may be a packaging device applicable to a wafer-level package (WLP) technology or a panel-level package (WLP) technology, such as a chip first process or a chip last (RDL first) process. Besides, the appearance of the electronic device may be rectangular, circular, polygonal, or a shape with curved edges, or other suitable shapes. The electronic device may have a peripheral system such as a drive system, a control system, a light source system, etc. to support a display device, an antenna device, a wearable device (such as including augmented reality or virtual reality), a vehicle-mounted device (such as including a car windshield), or a splicing device.

Figure 2A:
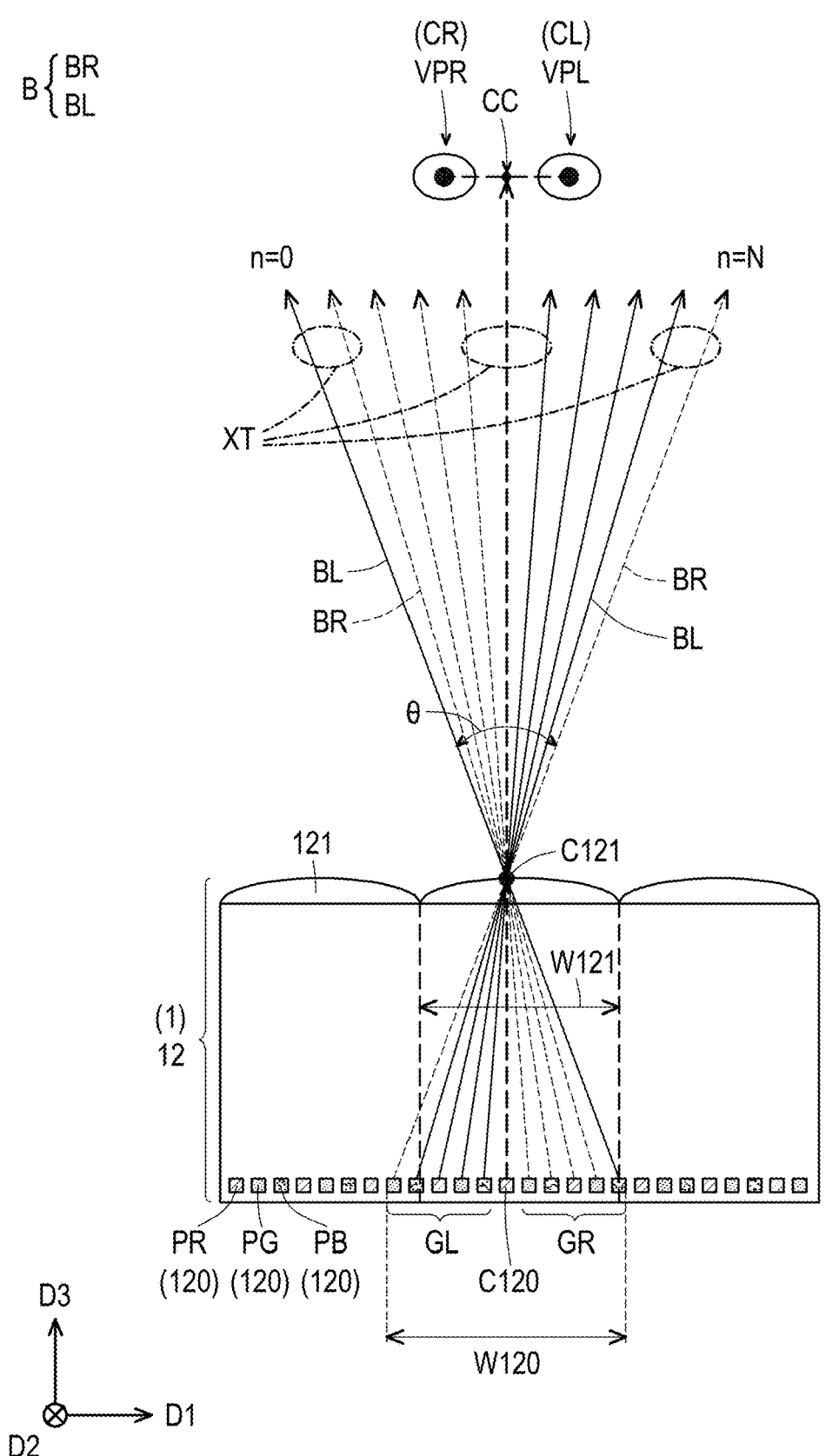
FIG. 2A and FIG. 2B are partial cross-sectional schematic views of the display in the three-dimensional display device according to some embodiments of the, illustrating different projection states of a plurality of light beams as the positions of the human eyes change.
Figure 2B:
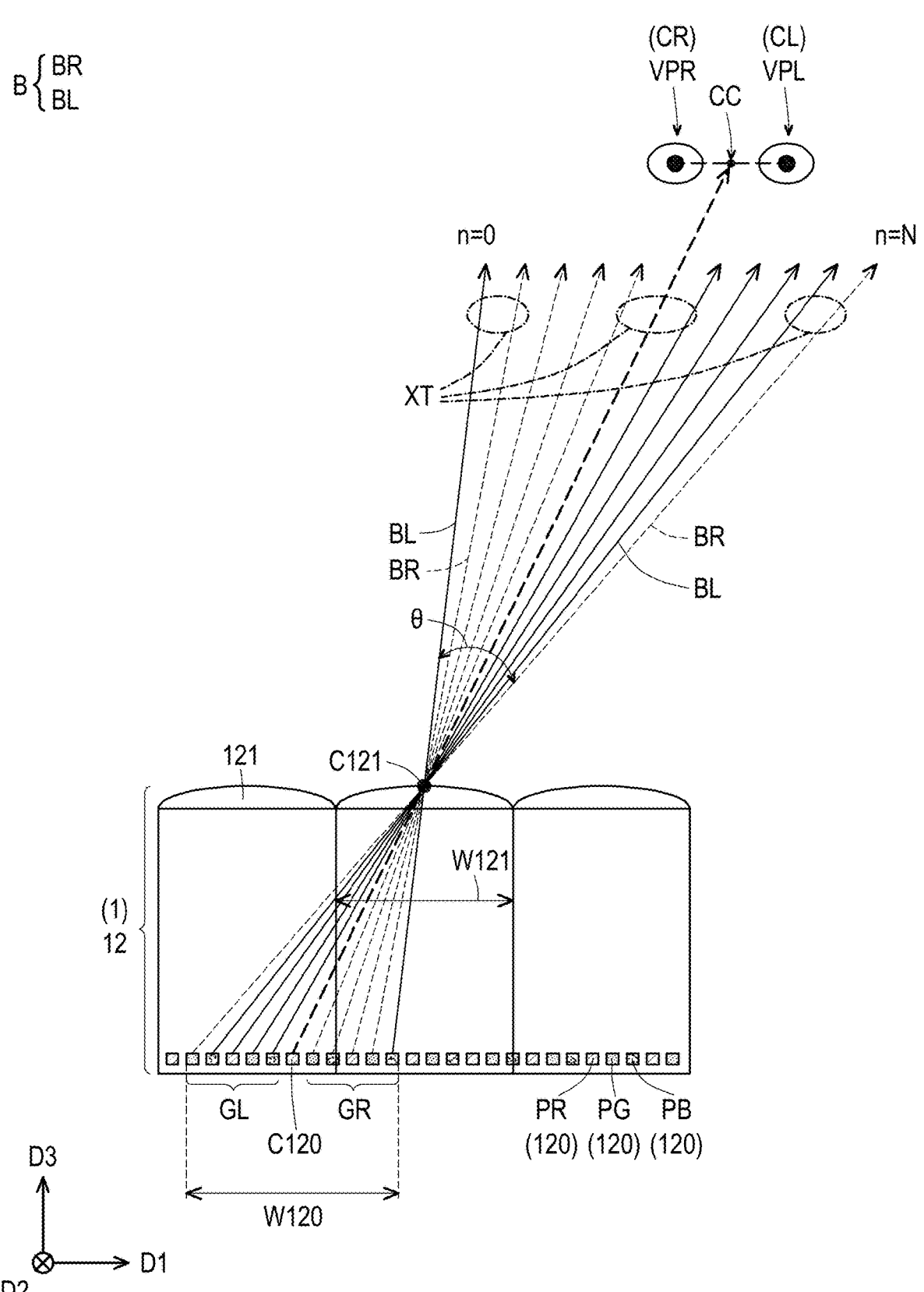
Figure 3:
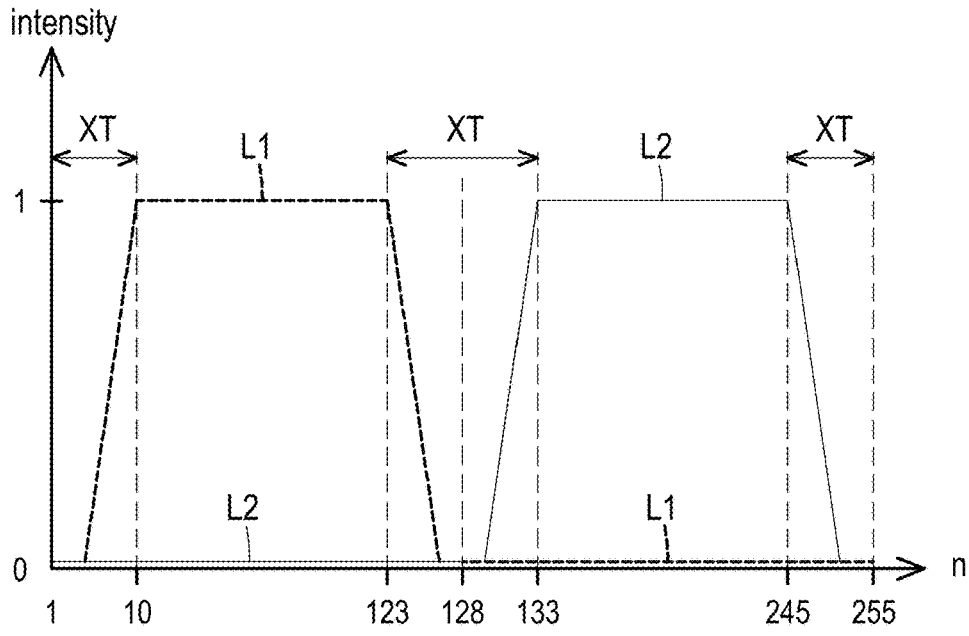
FIG. 3 is a graph showing a relationship between the light beams and light intensity.

FIG. 1 is a partial schematic top view of a display in a three-dimensional display device according to some embodiments of the disclosure. FIG. 2A and FIG. 2B are partial cross-sectional schematic views of the display in the three-dimensional display device according to some embodiments of the, illustrating different projection states of a plurality of light beams as the positions of the human eyes change. FIG. 3 is a graph showing a relationship between the light beams and light intensity. FIG. 4 to FIG. 8 are various block diagrams of the three-dimensional display device according to some embodiments of the disclosure. FIG. 9 is a flow chart of an operation method of a three-dimensional display device according to some embodiments of the disclosure. It should be understood that the following embodiments may replace, reorganize, and mix the features in several different embodiments to complete other embodiments without departing from the spirit of the disclosure. As long as the features of the embodiments do not violate the spirit of the disclosure or conflict each other, they may be mixed and matched as desired.

With reference to FIG. 1 to FIG. 4 first, a three-dimensional display device 1 may include an eye tracking device 10, a first processing unit 11, a display 12, and a second processing unit 13. The eye tracking device 10 provides left eye image data DL and right eye image data DR. The first processing unit 11 is coupled to the eye tracking device 10 and calculates coordinates of a left viewpoint VPL and coordinates of a right viewpoint VPR (e.g., coordinates CL and coordinates CR) based on the left eye image data DL and the right eye image data DR. The display displays an image and includes a plurality of light-emitting units 120 for emitting a plurality of light beams B and a plurality of light-splitting units 121 for distributing the light beams B to the left viewpoint VPL and the right viewpoint VPR. The second processing unit 13 is coupled to the first processing unit 11 and the display 12. The second processing unit 13 defines a crosstalk region XT based on an opening angle θ and optical paths (light transmission paths) of the light beams B passing through the light-splitting units 121. The crosstalk region XT is simultaneously struck by a first light beam among the plurality of light beams B (for example, at least one light beam among a plurality of left-eye image beams BL) assigned to the left viewpoint VPL and a second light beam among the plurality of light beams B (for example, at least one light beam among a plurality of right-eye image beams BR) assigned to the right viewpoint VPR. The second processing unit 13 compares a first preset gray level of the first light beam and a second preset gray level of the second light beam and then determines a first corrected gray level of the first light beam and a second corrected gray level of the second light beam.

In the specification, the three-dimensional display device 1 is, for example, a naked-eye three-dimensional display device, that is, a user can view a three-dimensional image without wearing stereoscopic glasses (also called 3D glasses). For instance, the three-dimensional display device 1 may be a display device such as a mobile phone or a tablet computer, a display device for augmented reality, virtual reality, dual view, etc., a vehicle device, or a medical device, etc., but the disclosure is not limited thereto.

Figure 4:
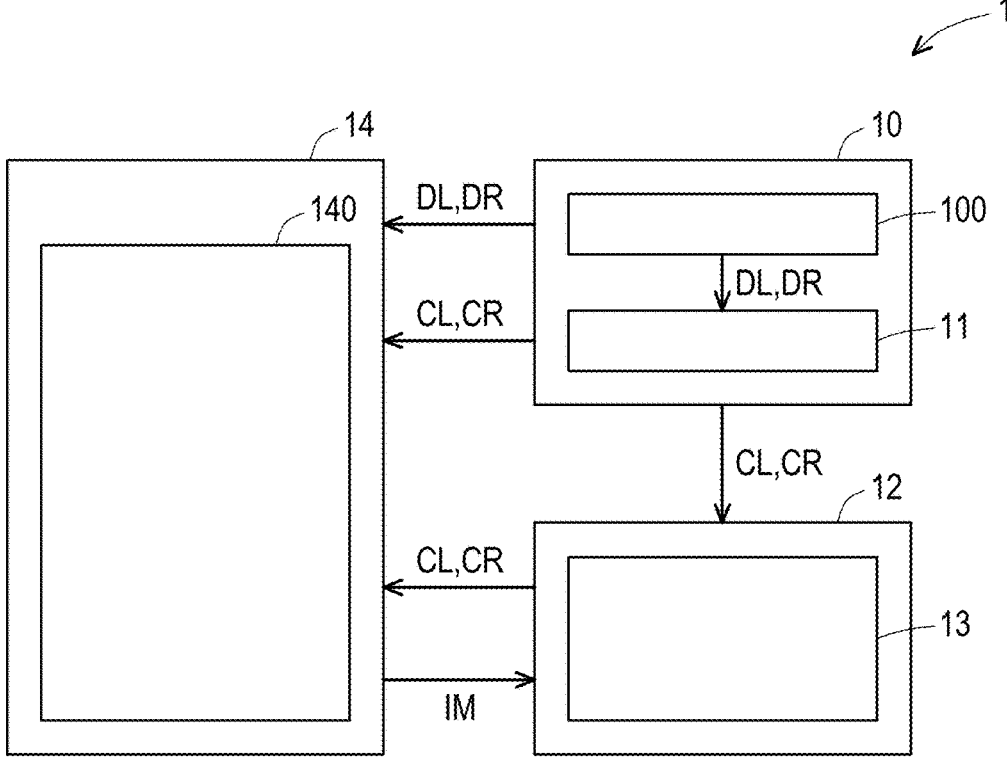
FIG. 4 to FIG. 8 are various block diagrams of the three-dimensional display device according to some embodiments of the disclosure.

In the three-dimensional display device 1, the eye tracking device 10 may provide the left eye image data DL and the right eye image data DR by capturing a user's image, especially a left-eye and right-eye image. In some embodiments, as shown in FIG. 4, the eye tracking device 10 may include an image capturing component 100 for capturing the left-eye and right-eye image. The image capturing component 100 includes, for example, two cameras capable of capturing two-dimensional images to obtain three-dimensional image data corresponding to the left and right eyes, but the disclosure is not limited thereto. Alternatively, the image capturing component 100 may include but not limited to a camera capable of capturing two-dimensional images and a depth sensor (e.g., a depth camera) capable of capturing depth information.

The image capturing component 100 may be coupled to the first processing unit 11 to provide the left eye image data DL and the right eye image data DR to the first processing unit 11. In the specification, coupling may include signal/data transmission in a wired or wireless manner.

The first processing unit 11 can calculate the coordinates CL of the left viewpoint VPL (e.g., the left eye) and the coordinates CL of the right viewpoint (e.g., the right eye) based on the left eye image data DL and the right eye image data DR provided by the image capturing component 100. For instance, the first processing unit 11 may be a processor, a chip, or other components with computing or processing functions. In some embodiments, as shown in FIG. 4, the first processing unit 11 may be integrated into the eye tracking device 10, but the disclosure is not limited thereto. According to different needs, the first processing unit 11 may be arranged in the eye tracking device 10, the display 12, or an external device (e.g., an image source 14).

In some embodiments, as shown in FIG. 4, the image capturing component 100 and the first processing unit 11 may be integrated into the eye tracking device 10, the second processing unit 13 may be integrated into the display 12, and the eye tracking device 10 may be coupled to the display 12, so as to provide the coordinates CL of the left viewpoint VPL and the coordinates CR of the right viewpoint VPR to the second processing unit 13 in the display 12. In this way, the second processing unit 13 may perform subsequent calculation and/or processing based on the coordinates CL of the left viewpoint VPL and the coordinates CR of the right viewpoint VPR, but the disclosure is not limited thereto. In some embodiments, as shown in FIG. 4, the three-dimensional display device 1 may further include the image source 14. The image source 14 may be used to provide a two-dimensional image (also called a planar image). For instance, the image source 14 may include one or a plurality of components 140, such as a computer, an endoscope, a processor, a playback box, or a streaming system.

In some embodiments, the image source 14 may also have computing and/or processing functions, and the image source 14 may be coupled to the eye tracking device 10 and the display 12. The eye tracking device 10 may provide at least one of the left eye image data DL, the right eye image data DR, the coordinates CL of the left viewpoint VPL, and the coordinates CR of the right viewpoint VPR to the image source 14. In some embodiments, as shown in FIG. 4, the display 12 may also provide the coordinates CL of the left viewpoint VPL and the coordinates CR of the right viewpoint VPR to the image source 14. The image source 14 may generate a left-eye and right-eye image IM with parallax according to the coordinates CL of the left viewpoint VPL and the coordinates CR of the right viewpoint VPR. Further, the image source 14 may provide the left-eye and right-eye image IM with parallax to the display 12.

The light-emitting units 120 in the display 12 are, for example, a plurality of pixels. In some embodiments, as shown in FIG. 1, FIG. 2A, or FIG. 2B, the light-emitting units 120 may include a plurality of red pixels PR, a plurality of green pixels PG, and a plurality of blue pixels PB. The plurality of red pixels PR, the plurality of green pixels PG, and the plurality of blue pixels PB are, for example, arranged in an alternating manner in a direction D1, and the plurality of pixels of the same color (for example, the plurality of red pixels PR, the plurality of green pixels PG, or the plurality of blue pixels PB) are arranged in a direction D2, for example. The direction D1 and the direction D2 are both perpendicular to a thickness direction (e.g., direction D3) of the display 12 and intersect each other. In some embodiments, the direction D1 and the direction D2 are perpendicular to each other, but the disclosure is not limited thereto. In some embodiments, the light-emitting units 120 may include but not limited to a plurality of organic light-emitting diodes, a plurality of sub-millimeter light-emitting diodes, a plurality of micro-light-emitting diodes, or a plurality of quantum dot light-emitting diodes.

The light-splitting units 121 in the display 12 are arranged on a light-emitting side of the light-emitting units 120, and the light-splitting units 121 may be used to distribute the light beams B to the left viewpoint VPL and the right viewpoint CPR. For instance, the light-splitting units 121 may include a plurality of cylindrical lens (as shown in FIG. 1, FIG. 2A, or FIG. 2B), a plurality of parallax barriers, or other components capable of splitting light. In some embodiments, as shown in FIG. 4, the light-splitting units 121 may be arranged in the direction D1 and extend in a direction D4, where the direction D4 may be neither parallel nor perpendicular to the direction D1, and direction D4 may be neither parallel nor perpendicular to the direction D2. By designing an extension direction (e.g., direction D4) of the light-splitting units 121 to be neither parallel nor perpendicular to an arrangement direction (e.g., direction D1 and direction D2) of the plurality of light-emitting units 120, the display quality may be improved, for example, the problem of Moiré pattern may be improved.

In a top view, as shown in FIG. 1, each of the light-splitting units 121 may overlap with more than one light-emitting unit 120 among the light-emitting units 120 in the direction D3. FIG. 1 only schematically illustrates 18 light-emitting units 120 and 3 light-splitting units 121, in which the light-splitting unit 121 located in the middle of FIG. 1 overlaps the 12 light-emitting units 120 in the direction D3. However, it should be understood that the number of light-emitting units 120 and light-splitting units 121 and/or the number of light-emitting units 120 overlapping each light-splitting unit 121 may be changed according to actual needs, and is not limited to what is shown in FIG. 1. Further, in some embodiments, although not shown, in addition to the light-emitting units 120 and the light-splitting units 121, the display 12 may also include but not limited to other components or film layers, such as a substrate, a color conversion layer, a filter layer, a polarizer, an adhesive layer, a protective layer, and/or a cover plate.

With reference to FIG. 1, each light-splitting unit 121 may have a center line M (virtual line) parallel to the extension direction (direction D4) of the light splitting unit 121. Whether the light-emitting unit 120 is used to provide the left-eye image beam BL or the right-eye image beam BR may be determined based on a position of a center of the light-emitting unit 120 relative to the center line M. Taking FIG. 1 as an example, the light-emitting unit 120 whose center is located on the right side of the center line M may be used to provide the left-eye image beam BL, and the light-emitting unit 120 whose center is located on the left side of the center line M may be used to provide the right-eye image beam BR. The part of the light-splitting unit 121 located on the right side of the center line M may be used to guide the left-eye image beam BL to the left viewpoint VPL, and the part of the light-splitting unit 121 located on the left side of the center line M may be used to guide the right-eye image beam BR to the right viewpoint VPR.

In an actual arrangement, some light-emitting units 120 may cross the center line M. FIG. 1 illustrates a light-emitting unit 120-1, a light-emitting unit 120-2, and a light-emitting unit 120-3 crossing the center line M. The center of the light-emitting unit 120-1 and the center of the light-emitting unit 120-3 are located on the left side of the center line M and provide the right-eye image beam BR, while the center of the light-emitting unit 120-2 is located on the right side of the center line M and provides the left-eye image beam BR. Most of the right-eye image beam BR from the light-emitting unit 120-1 and the light-emitting unit 120-3 is directed to the right viewpoint VPR by a portion of the light-splitting unit 121 located on the left side of the center line M. However, a small part of the right-eye image beam BR from the light-emitting unit 120-1 and the light-emitting unit 120-3 is directed to the left viewpoint VPL by a portion of the light-splitting unit 121 located on the right side of the center line M, thus causing image blur and/or ghosting problems. Similarly, most of the left-eye image beam BL from the light-emitting unit 120-2 is directed to the left viewpoint VPL by the portion of the light-splitting unit 121 located on the right side of the center line M. However, a small part of the left-eye image beam BL from the light-emitting unit 120-2 is directed to the right viewpoint VPR through the portion of the light-splitting unit 121 located on the left side of the center line M, thus causing image blur and/or ghosting problems. In addition, at least one light-emitting unit 120 located at an interface IF of adjacent light-splitting units 121 may also produce image blur and/or ghosting problems for similar reasons.

In order to improve the abovementioned imperfect matching problem between the light-splitting units 121 and the light-emitting units 120, a signal from the first processing unit 11 may be processed or calculated through the second processing unit 13 coupled to the first processing unit 11 and the display 12. Further, the crosstalk region XT is defined based on the opening angle $\theta$ and the optical paths of the light beams B passing through the light splitting units 121, and a correction result is fed back to the display 12, so that the display 12 displays the corrected left-eye and right-eye image IM. The second processing unit 13 is, for example, a field programmable gate array (FPGA), a chip, a timing controller, or other components with computing or processing functions. In some embodiments, as shown in FIG. 4, the second processing unit 13 may be integrated into the display 12, but the disclosure is not limited thereto. According to different needs, the second processing unit 13 may be arranged in the display 12 or an external device (e.g., the image source 14).

The opening angle $\theta$ of the light beams B may vary according to product design. For instance, the opening angle $\theta$ may be in a range of 5 degrees to 35 degrees, that is, $5° \leq \theta \leq 35°$, but the disclosure is not limited thereto. The crosstalk region XT refers to a region simultaneously struck by at least one left-eye image beam BL (also called the first light beam) among the light beams B assigned to the left viewpoint VPL and at least one right-eye image beam BR (also called the second light beam) among the light beams B assigned to the right viewpoint VPR, as shown in FIG. 2A or FIG. 2B. The crosstalk of the left viewpoint VPL is defined as, for example, an absolute value of the right-eye image beam BR minus the left-eye image beam BL, divided by the left-eye image beam BL, and then multiplied by 100%, that is [|(BR−BL)|/BL]*100%. Similarly, the cross-talk of the right viewpoint VPR is defined as, for example, an absolute value of the left-eye image beam BL minus the right-eye image beam BR, divided by the right-eye image beam BR, and then multiplied by 100%, that is [|(BL−BR)|/BR]*100%. The crosstalk region XT is, for example, a region where crosstalk (such as the crosstalk at the left viewpoint VPL and/or the crosstalk at the right viewpoint VPR) is greater than or equal to 10%. To be more specific, the second processing unit 13 may store data such as a position, focus, width, length, and height of each light-splitting unit 121, a position of each light-emitting unit 120, and a distance between each light-emitting unit 120 and each light-splitting unit 121 and may calculate the optical paths of the light beams emitted by each light-emitting unit 120 to the light-splitting units 121 and their optical paths and light-emitting angles after passing through the light-splitting units 121. In other words, the opening angle of a group of light-emitting units 120 corresponding to one light-emitting unit 121 may be calculated based on the above data, and then the crosstalk region may be defined, but the disclosure is not limited thereto.

As shown in FIG. 2A and FIG. 2B, the light-emitting unit group corresponding to the light-splitting units 121 changes as the position of the human eyes changes, for example. In some embodiments, one of the first processing unit 11 and the second processing unit 12 may further calculate human eye center coordinates CC based on the coordinates of the left viewpoint VPL and the coordinates of the right view-point VPR (e.g., the coordinates CL and the coordinates CR). One of the first processing unit 11 and the second processing unit 13 may further identify a central light-emitting unit C120 based on the human eye center coordi-nates CC and a center C121 of the corresponding light-splitting unit 121 (e.g., the light-splitting unit in FIG. 2A or FIG. 2B). One of the first processing unit 11 and the second processing unit 13 may further identify a left-group light-emitting unit GL and a right-group light-emitting unit GR located on both sides of the central light-emitting unit C120 based on the opening angle θ and the optical paths of the light-splitting units 120.

The central light-emitting unit C120 is, for example, a light-emitting unit among the light-emitting units 120 that is passed through by a line connecting the human eye center coordinates CC and the center C121 of the corresponding light-splitting unit 121. The left-group light-emitting unit GL includes plural light-emitting units located on the left side of the central light-emitting unit C120 and providing the left-eye image beam BL. The right-group light-emitting unit GR includes plural light-emitting units located on the right side of the central light-emitting unit C120 and providing the right-eye image beam BR. The number of light-emitting units 120 in either the left-group light-emitting unit GL and the right-group light-emitting unit GR may be determined according to actual needs. In some embodiments, widths W120 of the central light-emitting unit C120, the left-group light-emitting unit GL, and the right-group light-emitting unit GR correspond to widths W121 of the corresponding light-splitting units 121. For instance, the width W120 may be equal to or approximately similar to the width W121. The total number of the left-group light-emitting unit GL, the right-group light-emitting unit GR, and the central light-emitting unit C120 is, for example, the total number of the light-emitting units 120 within the width W120 range.

As shown in FIG. 2A or FIG. 2B, in some embodiments, the crosstalk region XT may correspond to, for example, a region where the central light-emitting unit C120 is located, two side regions of the left-group light-emitting unit GL, or two side regions of the right-group light-emitting unit GR. Regarding the light beams B in the crosstalk region XT, the second processing unit 13 may compare the first preset gray level corresponding to the first light beam (one or plural left-eye image beams BL) and the second preset gray level corresponding to the second light beam (one or plural right-eye image beams BR) to determine the first corrected gray level corresponding to the first light beam and the second corrected gray level corresponding to the second light beam. For instance, the first preset gray level is L, the second preset gray level is R, the first corrected gray level is L', the second corrected gray level is R', a correction parameter is $\alpha$, and the three-dimensional display device satisfies: $L'=L|(L-R)|*(1-\alpha)$ and $R'=R-|(L-R)|*(1-\alpha)$, where $0 \leq \alpha \leq 1$. According to the above relational expres-sions, the first corrected gray level is, for example, less than or equal to the first preset gray level, and the second corrected gray level is, for example, less than or equal to the second preset gray level. Besides, as a increases, L' or R' increases, which means that the gray level (or light intensity) decreases to a smaller extent. On the contrary, as a decreases, L' or R' decreases, which means that the gray level (or light intensity) decreases to a greater extent.

For instance, if the first preset gray level L is 255, the second preset gray level R is 128, and the correction parameter a is 0.5, then according to the aforementioned relational expressions, it can be calculated that the first corrected gray level L' is 192 (the result is rounded after the decimal point), and the second corrected gray level R' is 65. If the first preset gray level L is 255, the second preset gray level R is 255, and the correction parameter a is 0.5, then according to the aforementioned relational expressions, it can be calculated that the first corrected gray level L' is 255, and the second corrected gray level R' is 255.

By comparing the difference between the preset gray levels of the left and right eyes (e.g., |(L−R)|) and then performing gray level correction, when the preset gray levels of the left and right eyes are the same or are similar (when the images are the same or are similar), the magnitude of the adjustment of the gray levels of the left and right eyes may be reduced or the gray level difference between the corrected image and the preset image may be reduced, so that the light intensity of the overall image is maintained. It should be understood that the foregoing relational expressions are only examples, and in other embodiments, other relational expressions may be used to perform gray level correction.

In some embodiments, the correction parameter a may vary with a distance between the corresponding light-emit-ting unit 120 and the central light-emitting unit C120. For example, as shown in FIG. 2A or FIG. 2B, the opening angle θ may be cut into N equal parts, and the light beams in each equal part are numbered, such as n=0 to n=N. Next, the abovementioned gray level correction may be performed on these light beams from n=0 to N. For convenience of explanation, N=255 is used as an example in FIG. 3, that is, the plurality of light beams B are divided into light beams numbered n ranging from 0 to 255, but the disclosure is not limited thereto. In other embodiments, N may be a larger or smaller value. For instance, as the resolution increases, N may be a larger value to perform more precise gray level correction.

In FIG. 3, n=0 to 128 are, for example, light beams corresponding to the plurality of light-emitting units 120 in the right-group light-emitting unit GR in FIG. 2A or FIG. 2B, and n=128 to 255 are, for example, light beams corresponding to the plurality of light-emitting units 120 in the left-group light-emitting unit GL in FIG. 2A or FIG. 2B. The dotted line L1 in FIG. 3 represents a light intensity curve of the right-eye image beam, and the solid line L2 represents a light intensity curve of the left-eye image beam. In an ideal situation, the light intensity of the right-eye image beam is 0 from n=128 to 255, and the light intensity of the left-eye image beam is 0 from n=0 to 128, in order to achieve ideal image quality (for example, low crosstalk).

In FIG. 3, the crosstalk region XT is struck by light beams with n=0 to 10, n=123 to 133, and n=245 to 255, where n=0 to 10 are the light beams corresponding to the plurality of light-emitting units 120 on a side away from the central light-emitting unit C120 in the right-group light-emitting unit GR in FIG. 2A or FIG. 2B, n=123 to 133 are the light beams corresponding to the plurality of light-emitting units 120 on a side adjacent to the central light-emitting unit C120 in the right-group light-emitting unit GR and the light beams corresponding to the plurality of light-emitting units 120 on a side adjacent to the central light-emitting unit C120 in the left-group light-emitting unit GL in FIG. 2A or FIG. 2B, and n=245 to 255 are the light beams corresponding to the plurality of light-emitting units 120 on a side away from the central light-emitting unit C120 in the left-group light-emitting unit GL in FIG. 2A or FIG. 2B.

In some embodiments, on a side of the left-group light-emitting unit GL away from the central light-emitting unit C120, α (correction parameter) may gradually decrease as the distance between the corresponding light-emitting unit 120 and the central light-emitting unit C120 increases (with reference to n=245 to 255). On a side of the left-group light-emitting unit GL adjacent to the central light-emitting unit C120, a may gradually decrease as the distance between the corresponding light-emitting unit 120 and the central light-emitting unit C120 decreases (with reference to n=128 to 133). On a side of the right-group light-emitting unit GR away from the central light-emitting unit C120, α may gradually decreases as the distance between the corresponding light-emitting unit 120 and the central light-emitting unit C120 increases (with reference to n=123 to 128). On a side of the right-group light-emitting unit GR adjacent to the central light-emitting unit C120, α may gradually decrease as the distance between the corresponding light-emitting unit 120 and the central light-emitting unit C120 decreases (with reference to n=0 to 10).

For instance, from n=0 to n=10, α may gradually change from 0 to 1, from n=123 to n=128, α may gradually change from 1 to 0, from n=128 to n=133, α may gradually change from 0 to 1, and from n=245 to n=255, α may gradually change from 1 to 0.

By gradually reducing the light intensity of the multiple light beams incident on the crosstalk region XT (or the gray level of the corresponding light-emitting unit), the crosstalk may be improved and the light intensity uniformity of the overall image can be improved, further improving the image quality.

In some embodiments, the second processing unit 13 may further compare the first corrected gray level L', the first preset gray level L, and the second preset gray level R. When the first corrected gray level 1 L' is between the first preset gray level L and the second preset gray level R, the display 12 displays the first corrected preset gray level L'. When the first corrected gray level L' is less than a smaller value of the first preset gray level L and the second preset gray level R, the display 12 displays the smaller value of the first preset gray level L and the second preset gray level R. In some embodiments, the second processing unit 13 may further compare the second corrected gray level R', the first preset gray level L, and the second preset gray level R. When the second corrected gray level R' is between the first preset gray level L and the second preset gray level R, the display 12 displays the second corrected gray level R'. When the second corrected gray level R' is less than a smaller value of the first preset gray level L and the second preset gray level R, the display 12 displays the smaller value of the first preset gray level L and the second preset gray level R. For instance, according to the abovementioned relational expressions, if first preset gray level L is 255, the second preset gray level R is 128, and the correction parameter a is 0.5, then it can be calculated that the first corrected gray level L' is 192, and the second corrected gray level R' is 65. Since the calculated first corrected gray level 1 L' is between the first preset gray level L and the second preset gray level R, the display 12 displays the first corrected gray level L'. On the other hand, since the second corrected gray level R' is less than the smaller value of the first preset gray level L and the second preset gray level R (the smaller value of 255 mad 128 is 128), the display 12 displays the smaller value (i.e., 128) of the first preset gray level L and the second preset gray level R.

By further comparing the corrected gray level (e.g., the first corrected gray level L' or the second corrected gray level R') and the preset gray level (including the first preset gray level L and the second preset gray level R) and adjusting the gray level displayed by the display 12 according to the comparison result, the degree of variation in the gray level value may be reduced, so that the light intensity of the left-eye and right-eye image displayed on the display 12 is closer to the expected light intensity.

When providing evidence, the first preset gray level L and the second preset gray R may be input to the three-dimensional display device, and the first preset gray level L is different from the second preset gray level R. Next, an image screenshot may be taken to confirm the first corrected gray level L' and the second corrected gray level R'. If both the first corrected gray level L' and the second corrected gray level R' are greater than or equal to the smaller value of the first preset gray level L and the second preset gray level R, it is determined that the three-dimensional display device may perform the aforementioned step of comparing the corrected gray level and the preset gray level. On the contrary, if at least one of the first corrected gray level L' and the second corrected gray level R' is smaller than the smaller value of the first preset gray level L and the second preset gray level R, it is determined that the three-dimensional display device does not perform the aforementioned step of comparing the corrected gray level and the preset gray level, and the simultaneous equations may be further solved by analyzing the image screenshot and the source image changes (inputting different first preset gray level L and second preset gray level R and confirming the first corrected gray level L' and the second corrected gray level R') to obtain the original relational expression.

Figure 5:
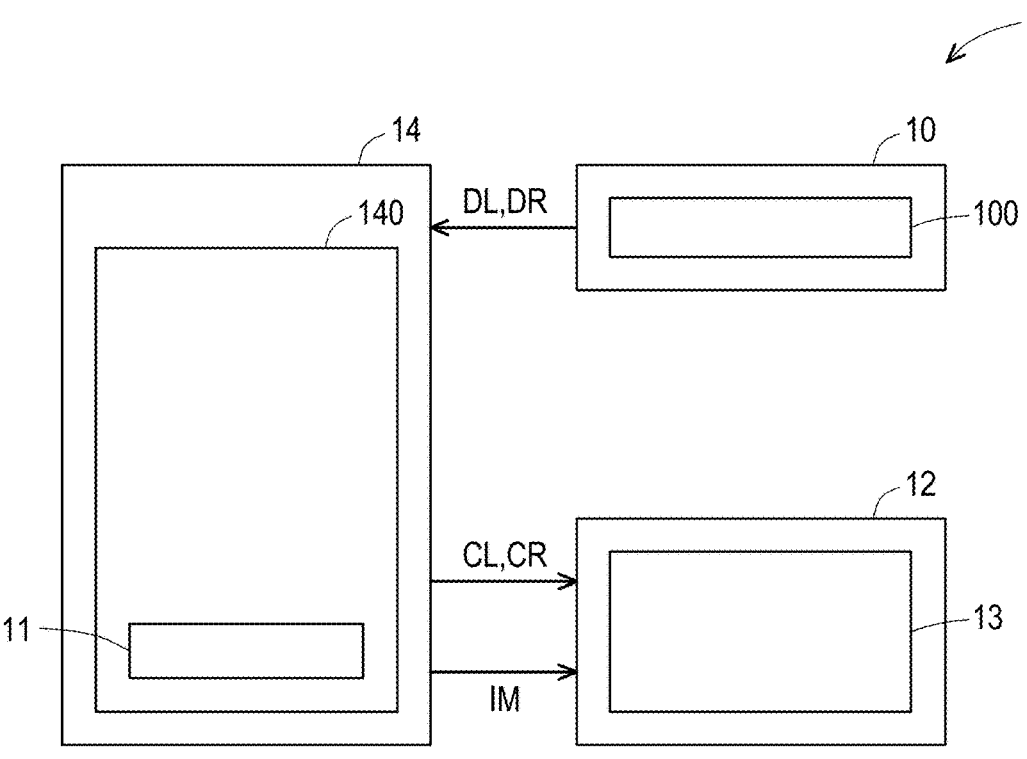

In some embodiments, as shown in FIG. 5, the first processing unit 11 may be arranged in the image source 14. For instance, the component 140 may be a component 140 having computing capability, and the first processing unit 11 may be arranged in the component 140, but the disclosure is not limited thereto.

Figure 6:
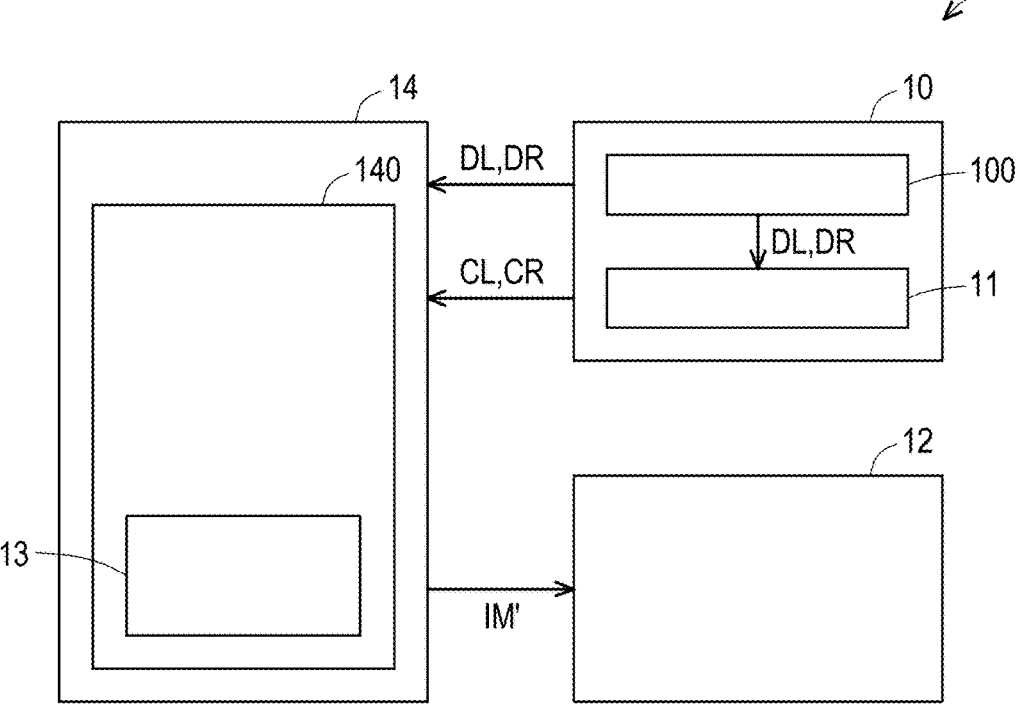

In some embodiments, as shown in FIG. 6, the second processing unit 13 may be arranged in the image source 14. For instance, the component 140 may be a component 140 having computing capability, and the second processing unit 13 may be arranged in the component 140, but the disclosure is not limited thereto. The second processing unit 13 can provide a calculated three-dimensional image IM' to the display 12, so that the display 12 may display the three-dimensional image IM'.

Figure 7:
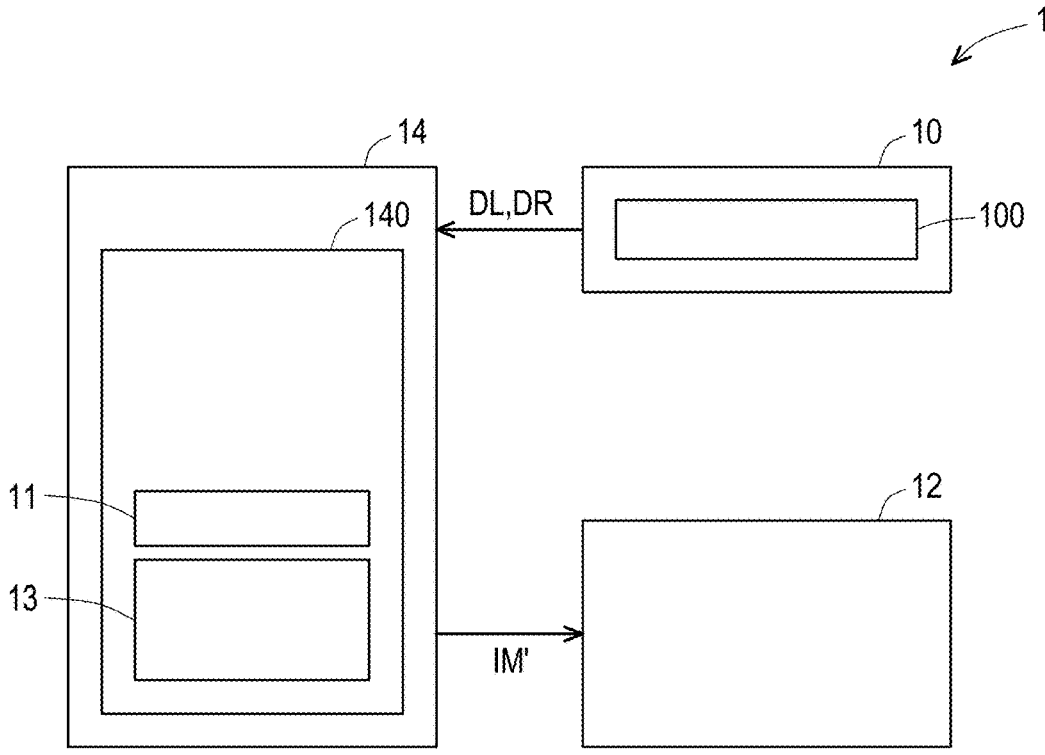

In some embodiments, as shown in FIG. 7, the first processing unit 11 and the second processing unit 13 may be arranged in the image source 14 together. For instance, the component 140 may be a component 140 having computing capability, and the first processing unit 11 and the second processing unit 13 may be arranged in the component 140 together, but the disclosure is not limited thereto. The second processing unit 13 can provide the calculated three-dimensional image IM' to the display 12, so that the display 12 may display the three-dimensional image IM'.

Figure 8:
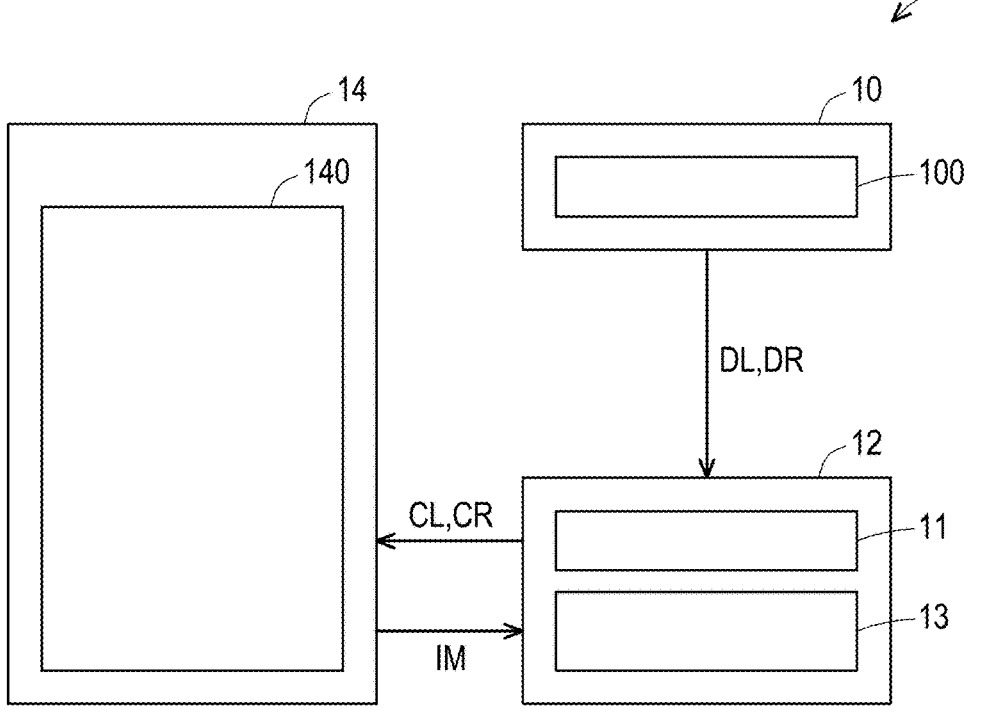

In some embodiments, as shown in FIG. 8, the first processing unit 11 and the second processing unit 13 may be arranged in the display 12 together. The display 12 may provide the coordinates of the left viewpoint VPL and the right viewpoint VPR (e.g., the coordinates CL and the coordinates CR) to the image source 14. The image source 14 may include one or a plurality of components 140, such as a computer, an endoscope, a processor, a playback box, or a streaming system, so as to generate the left-eye and right-eye image IM with parallax. The second processing unit 13 may process or calculate the left-eye and right-eye image IM to display a three-dimensional image.

With reference to FIG. 9, an operation method of a three-dimensional display device includes the following steps. Left eye image data and right eye image data are provided (step S100). Based on the left eye image data and the right eye image data, coordinates of a left viewpoint and coordinates a right viewpoint are calculated (step S102). An image is displayed through a display including a plurality of light-emitting units for emitting light beams and a plurality of light-splitting units for distributing the light beams to the left viewpoint and the right viewpoint (step S104). A crosstalk region is defined based on an opening angle and optical paths of the plurality of light beams passing through the plurality of light-splitting units. The crosstalk region is simultaneously struck by a first light beam among the plurality of light beams assigned to the left viewpoint and a second light beam among the plurality of light beams assigned to the right viewpoint (step S106). Further, a first preset gray level of the first light beam and a second preset gray level of the second light beam are compared to determine a first corrected gray level of the first light beam and a second corrected gray level of the second light beam (step S108). The details of the above steps may be found in the above description and thus are not repeated herein.

In view of the foregoing, in the embodiments of the disclosure, by comparing the difference between the preset gray levels of the left and right eyes and then performing gray level correction, when the preset gray levels of the left and right eyes are the same or are similar (when the images are the same or are similar), the magnitude of the adjustment of the gray levels of the left and right eyes may be reduced or the gray level difference between the corrected image and the preset image may be reduced, so that the light intensity of the overall image is maintained or the quality of three-dimensional image is improved.

The foregoing embodiments are merely described to illustrate the technical means of the disclosure and should not be construed as limitations of the disclosure. Even though the foregoing embodiments are referenced to provide detailed description of the disclosure, a person having ordinary skill in the art should understand that various modifications and variations can be made to the technical means in the disclosed embodiments, or equivalent replacements may be made for part or all of the technical features. Nevertheless, it is intended that the modifications, variations, and replacements shall not make the nature of the technical means to depart from the scope of the technical means of the embodiments of the disclosure.

Although the embodiments of the disclosure and advantages thereof are disclosed as above, it should be understood that a person having ordinary skill in the art may make changes, substitutions, and modifications without departing from the spirit and scope of the disclosure. Further, the features between the embodiments may be randomly mixed and replaced to form other new embodiments. Moreover, the scope of the disclosure is not intended to be limited to the particular embodiments of the processes, machines, manufactures, compositions of matters, means, methods, and steps described in the specification. As a person having ordinary skill in the art will readily appreciate from the disclosure, the processes, machines, manufacture, compositions of matters, means, methods, or steps, presently existing or later to be developed, that perform substantially the same function or achieve substantially the same result as the corresponding embodiments described herein may be utilized according to the disclosure. Accordingly, the claims of the disclosure are intended to include within their scope of such processes, machines, manufacture, compositions of matter, means, methods, and/or steps. Further, each claim constitutes an individual embodiment, and the scope of the disclosure further covers a combination of each claim and the respective embodiment. The protection scope of the disclosure shall be defined by the appended claims.

What is claimed is:

1. A three-dimensional display device, comprising:
  an eye tracking device for providing left eye image data and right eye image data;
  a first processing unit coupled to the eye tracking device and calculating coordinates of a left viewpoint and coordinates of a right viewpoint based on the left eye image data and the right eye image data;
  a display for displaying an image and comprising:
  a plurality of light-emitting units for emitting a plurality of light beams; and
  a plurality of light-splitting units for distributing the plurality of light beams to the left viewpoint and the right viewpoint; and
  a second processing unit coupled to the first processing unit and the display,
  wherein the second processing unit defines a crosstalk region based on an opening angle and optical paths of the plurality of light beams passing through the plurality of light-splitting units, the crosstalk region is simultaneously struck by a first light beam among the plurality of light beams assigned to the left viewpoint and a second light beam among the plurality of light beams assigned to the right viewpoint, and the second processing unit compares a first preset gray level corresponding to the first light beam and a second preset gray level corresponding to the second light beam to determine a first corrected gray level corresponding to the first light beam and a second corrected gray level corresponding to the second light beam, wherein the first preset gray level is L, the second preset gray level is R, the first corrected gray level is L', the second corrected gray level is R', a correction parameter is α, and the three-dimensional display device satisfies:

$L'=L-|(L-R)|*(1-\alpha)$, and $R'=R-|(L-R)|*(1-\alpha)$, wherein $0 \leq \alpha \leq 1$.

2. The three-dimensional display device according to claim 1, wherein one of the first processing unit and the second processing unit further calculates human eye center coordinates based on the coordinates of the left viewpoint and the coordinates of the right viewpoint, one of the first processing unit and the second processing unit further identifies a central light-emitting unit based on the human eye center coordinates and a center of the corresponding light-splitting unit, and one of the first processing unit and the second processing unit further identifies a left-group light-emitting unit and a right-group light-emitting unit located on both sides of the central light-emitting unit based on the opening angle and the optical paths of the plurality of light-splitting units.

3. The three-dimensional display device according to claim 2, wherein widths of the central light-emitting unit, the left-group light-emitting unit, and the right-group light-emitting unit correspond to widths of the corresponding light-splitting units.

4. The three-dimensional display device according to claim 2, wherein the central light-emitting unit, the left-group light-emitting unit, and the right-group light-emitting unit corresponding to the human eye center coordinates at a first position are different from the central light-emitting unit, the left-group light-emitting unit, and the right-group light-emitting unit corresponding to the human eye center coordinates at a second position.

5. The three-dimensional display device according to claim 1, wherein the crosstalk region corresponds to a region where a central light-emitting unit is located, two side regions of a left-group light-emitting unit, or two side regions of a right-group light-emitting unit, and wherein:

on a side of the left-group light-emitting unit away from the central light-emitting unit, α gradually decreases as a distance between the corresponding light-emitting unit and the central light-emitting unit increases, on a side of the left-group light-emitting unit adjacent to the central light-emitting unit, α gradually decreases as the distance between the corresponding light-emitting unit and the central light-emitting unit decreases, on a side of the right-group light-emitting unit away from the central light-emitting unit, α gradually decreases as the distance between the corresponding light-emitting unit and the central light-emitting unit increases, and on a side of the right-group light-emitting unit adjacent to the central light-emitting unit, α gradually decreases as the distance between the corresponding light-emitting unit and the central light-emitting unit decreases.

6. The three-dimensional display device according to claim 1, wherein the second processing unit further compares the first corrected gray level, the first preset gray level, and the second preset gray level, when the first corrected gray level is between the first preset gray level and the second preset gray level, the display displays the first preset gray level, and when the first corrected gray level is less than a smaller value of the first preset gray level and the second preset gray level, the display displays the smaller value of the first preset gray level and the second preset gray level.

7. The three-dimensional display device according to claim 1, wherein the second processing unit further compares the second corrected gray level, the first preset gray level, and the second preset gray level, when the second corrected gray level is between the first preset gray level and the second preset gray level, the display displays the second preset gray level, and when the second corrected gray level is less than a smaller value of the first preset gray level and the second preset gray level, the display displays the smaller value of the first preset gray level and the second preset gray level.

8. The three-dimensional display device according to claim 1, wherein the first processing unit is arranged in the eye tracking device, the display, or an external device.

9. The three-dimensional display device according to claim 1, wherein the second processing unit is arranged in the display or an external device.

10. The three-dimensional display device according to claim 1, wherein an extension direction of the plurality of light-splitting units is neither parallel nor perpendicular to an arrangement direction of the plurality of light-emitting units.

11. The three-dimensional display device according to claim 1, wherein the opening angle is in a range of 5 degrees to 35 degrees.

12. An operation method of a three-dimensional display device, comprising:

providing left eye image data and right eye image data;

calculating coordinates of a left viewpoint and coordinates a right viewpoint based on the left eye image data and the right eye image data;

displaying an image through a display comprising a plurality of light-emitting units for emitting a plurality of light beams and a plurality of light-splitting units for distributing the plurality of light beams to the left viewpoint and the right viewpoint;

defining a crosstalk region based on an opening angle and optical paths of the plurality of light beams passing through the plurality of light-splitting units, wherein the crosstalk region is simultaneously struck by a first light beam among the plurality of light beams assigned to the left viewpoint and a second light beam among the plurality of light beams assigned to the right viewpoint; and comparing a first preset gray level corresponding to the first light beam and a second preset gray level corresponding to the second light beam to determine a first corrected gray level corresponding to the first light beam and a second corrected gray level corresponding to the second light beam, wherein the first preset gray level is L, the second preset gray level is R, the first corrected gray level is L', the second corrected gray level is R', a correction parameter is α, and the three-dimensional display device satisfies:

$L'=L-|(L-R)|*(1-\alpha)$, and $R'=R-|(L-R)|*(1-\alpha)$, wherein $0 \leq \alpha \leq 1$.

13. The operation method of the three-dimensional display according to claim 12, further comprising:

calculating human eye center coordinates based on the coordinates of the left viewpoint and the coordinates of the right viewpoint;

identifying a central light-emitting unit based on the human eye center coordinates and a center of the corresponding light-splitting unit; and identifying a left-group light-emitting unit and a right-group light-emitting unit located on both sides of the central light-emitting unit based on the opening angle and the optical paths of the plurality of light-splitting units.

14. The operation method of the three-dimensional display according to claim 13, wherein widths of the central light-emitting unit, the left-group light-emitting unit, and the right-group light-emitting unit correspond to widths of the corresponding light-splitting units.

15. The operation method of the three-dimensional display according to claim 13, wherein the central light-emitting unit, the left-group light-emitting unit, and the right-group light-emitting unit corresponding to the human eye center coordinates at a first position are different from the central light-emitting unit, the left-group light-emitting unit, and the right-group light-emitting unit corresponding to the human eye center coordinates at a second position.

16. The operation method of the three-dimensional display according to claim 12, wherein the crosstalk region corresponds to a region where a central light-emitting unit is located, two side regions of a left-group light-emitting unit, or two side regions of a right-group light-emitting unit, and wherein:

on a side of the left-group light-emitting unit away from the central light-emitting unit, $\alpha$ gradually decreases as a distance between the corresponding light-emitting unit and the central light-emitting unit increases, on a side of the left-group light-emitting unit adjacent to the central light-emitting unit, $\alpha$ gradually decreases as the distance between the corresponding light-emitting unit and the central light-emitting unit decreases, on a side of the right-group light-emitting unit away from the central light-emitting unit, $\alpha$ gradually decreases as the distance between the corresponding light-emitting unit and the central light-emitting unit increases, and on a side of the right-group light-emitting unit adjacent to the central light-emitting unit, $\alpha$ gradually decreases as the distance between the corresponding light-emitting unit and the central light-emitting unit decreases.

17. The operation method of the three-dimensional display according to claim 12, further comprising:

comparing the first corrected gray level, the first preset gray level, and the second preset gray level, wherein when the first corrected gray level is between the first preset gray level and the second preset gray level, the display displays the first preset gray level, and when the first corrected gray level is less than a smaller value of the first preset gray level and the second preset gray level, the display displays the smaller value of the first preset gray level and the second preset gray level.

18. The operation method of the three-dimensional display according to claim 12, further comprising:

comparing the second corrected gray level, the first preset gray level, and the second preset gray level, wherein when the second corrected gray level is between the first preset gray level and the second preset gray level, the display displays the second preset gray level, and when the second corrected gray level is less than a smaller value of the first preset gray level and the second preset gray level, the display displays the smaller value of the first preset gray level and the second preset gray level.

* * * * *